United States Patent
Altaf et al.

(10) Patent No.: US 11,144,606 B2
(45) Date of Patent: *Oct. 12, 2021

(54) UTILIZING ONLINE CONTENT TO SUGGEST ITEM ATTRIBUTE IMPORTANCE

(71) Applicant: INTERNATIONAL BUSINESS MACHINES CORPORATION, Armonk, NY (US)

(72) Inventors: Faheem Altaf, Pflugerville, TX (US); Lisa Seacat DeLuca, Baltimore, MD (US); Raghuram Srinivas, McKinney, TX (US)

(73) Assignee: International Business Machines Corporation, Armonk, NY (US)

( * ) Notice: Subject to any disclaimer, the term of this patent is extended or adjusted under 35 U.S.C. 154(b) by 162 days.

This patent is subject to a terminal disclaimer.

(21) Appl. No.: 16/669,730

(22) Filed: Oct. 31, 2019

(65) Prior Publication Data

US 2020/0065345 A1 Feb. 27, 2020

Related U.S. Application Data

(63) Continuation of application No. 15/412,585, filed on Jan. 23, 2017, now Pat. No. 10,528,633.

(51) Int. Cl.
```
G06F 15/16      (2006.01)
G06F 16/9535    (2019.01)
G06F 16/31      (2019.01)
```

(52) U.S. Cl.
CPC ........ *G06F 16/9535* (2019.01); *G06F 16/313* (2019.01)

(58) Field of Classification Search
None
See application file for complete search history.

(56) References Cited

U.S. PATENT DOCUMENTS

| | | |
|---|---|---|
| 6,728,706 B2 | 4/2004 | Aggarwal |
| 7,082,426 B2 | 7/2006 | Musgrove et al. |
| 7,219,099 B2 | 5/2007 | Kuntala et al. |
| 7,908,166 B2 | 3/2011 | Keil et al. |
| 8,156,073 B1 | 4/2012 | Dave |
| 8,589,399 B1 | 11/2013 | Lee |
| 9,311,372 B2 | 4/2016 | Garera et al. |
| 9,569,700 B1 | 2/2017 | Santos |
| 2001/0044795 A1 | 11/2001 | Cohen |
| 2003/0037034 A1 | 2/2003 | Daniels |
| 2003/0195793 A1 | 10/2003 | Jain |
| 2004/0015415 A1 | 1/2004 | Cofino |
| 2004/0205044 A1 | 10/2004 | Su |
| 2005/0055357 A1 | 3/2005 | Campbell |

(Continued)

FOREIGN PATENT DOCUMENTS

WO    2013009613    1/2013

OTHER PUBLICATIONS

Friedman, Mark J.; List of IBM Patents or Patent Applications Treated as Related; Oct. 31, 2019; 1 page.

(Continued)

*Primary Examiner* — Alex Gofman
(74) *Attorney, Agent, or Firm* — Schmeiser, Olsen & Watts; Stephanie Carusillo (57) ABSTRACT

Utilizing social media and articles to suggest item attribute importance to improve site level searching for a user.

18 Claims, 4 Drawing Sheets

(56) References Cited

U.S. PATENT DOCUMENTS

| | | |
|---|---|---|
| 2008/0097822 A1 | 4/2008 | Schigel |
| 2009/0150141 A1 | 6/2009 | Wible |
| 2010/0121631 A1 | 5/2010 | Bonnet |
| 2012/0143883 A1 | 6/2012 | Chen |
| 2013/0013616 A1 | 1/2013 | Leidner |
| 2015/0254230 A1* | 9/2015 | Papadopoullos ....... G06F 16/31 704/8 |
| 2015/0378975 A1 | 12/2015 | Wu |
| 2016/0203217 A1 | 7/2016 | Anisingaraju |
| 2016/0292705 A1 | 10/2016 | Ayzenshtat |
| 2016/0379289 A1 | 12/2016 | More |
| 2017/0124619 A1 | 5/2017 | Abhishek |
| 2017/0177710 A1 | 6/2017 | Burlik |
| 2017/0178037 A1 | 6/2017 | Kaye |
| 2017/0221120 A1 | 8/2017 | Pathak |
| 2018/0189403 A1 | 7/2018 | Altaf |
| 2018/0210957 A1 | 7/2018 | Altaf |
| 2019/0213277 A1 | 7/2019 | Deluca |

OTHER PUBLICATIONS

Unstructured (definition); Merriam-Webster online dictionary webpage; https://www.merriam-webster.com/dictionary/unstructured; retrieved Sep. 13, 2018; 13 pages.

* cited by examiner

UTILIZING ONLINE CONTENT TO SUGGEST ITEM ATTRIBUTE IMPORTANCE

CROSS REFERENCE TO RELATED APPLICATIONS

This application is a continuation application claiming priority to Ser. No. 15/412,585 filed Jan. 23, 2017, the contents of which are hereby incorporated by reference.

BACKGROUND

The present invention relates to data mining, and more specifically to utilizing online content to suggest item attribute importance to improve site level search.

Searching via natural language is a very desirable, user friendly method of searching. Natural language searching is designed to work ideally with data in a non-structured format. Unfortunately, most enterprise's systems of records have data in a structured format. A structured format data record from a product data catalog can be converted into a plurality of unstructured name/value pair attributes associated with the record. However, in some instances, too many attributes can actually obfuscate the search, resulting is less than optimal search results.

SUMMARY

According to one embodiment of the present invention, a method of utilizing online content to suggest attribute importance for an item to improve site level searching is disclosed. The method comprising the steps of: the computer searching for and monitoring the online content for attributes of an item to determine attributes referenced for the item; the computer monitoring the online content to determine how often attributes of the item are referenced; and the computer adjusting a presence of an attribute from a value pair attribute associated with the item based on the determination of how often attributes of the item are referenced.

According to another embodiment of the present invention, a computer program product for utilizing online content to suggest attribute importance for an item to improve site level searching is disclosed. A computer comprising at least one processor, one or more memories, one or more computer readable storage media, the computer program product comprising a computer readable storage medium having program instructions embodied therewith, the program instructions executable by the computer to perform a method comprising: searching for and monitoring, by the computer, the online content for attributes of an item to determine attributes referenced for the item; monitoring, by the computer, the online content to determine how often attributes of the item are referenced; and adjusting, by the computer, a presence of an attribute from a value pair attribute associated with the item based on the determination of how often attributes of the item are referenced.

According to another embodiment of the present invention, a computer system for utilizing online content to suggest attribute importance for an item to improve site level searching is disclosed. The computer system comprising: a computer comprising at least one processor, one or more memories, one or more computer readable storage media having program instructions executable by the computer to perform the program instructions. The program instructions comprising: searching for and monitoring, by the computer, the online content for attributes of an item to determine attributes referenced for the item; monitoring, by the computer, the online content to determine how often attributes of the item are referenced; and adjusting, by the computer, a presence of an attribute from a value pair attribute associated with the item based on the determination of how often attributes of the item are referenced.

DETAILED DESCRIPTION

In an embodiment of the present invention, a candidate set of structured attributes for an item is determined and online content such as social media, news articles, expert testimony regarding the item, blogs, forums, and support documents is monitored to determine how often the attributes are referenced, where the only attributes that are saved are attributes that reach a reference threshold. Therefore, when a natural language search or query is performed, a superior result in response to the search is achieved, since only popular, trending, or significant attributes are considered for the items based on online content such as social media, reviews and expert testimony. The item may be a physical item or a nonphysical item, which can have features or attributes.

Figure 1:
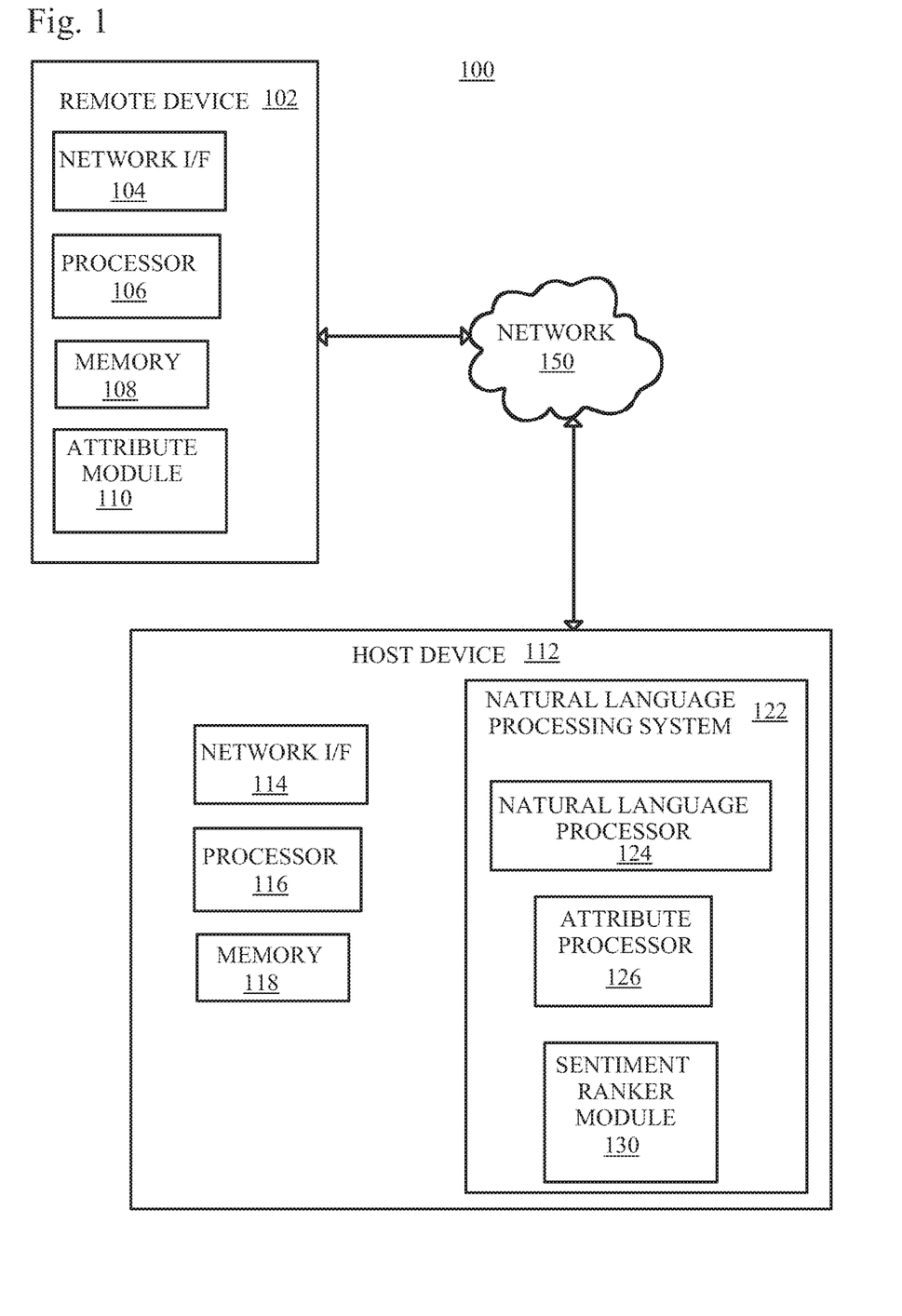
FIG. 1 illustrates a block diagram of an example computing environment in which illustrative embodiments of the present disclosure may be implemented.

Aspects of the disclosure may relate to natural language processing. Accordingly, an understanding of the embodiments of the present disclosure may be aided by describing embodiments of natural language processing systems and the environments in which these systems may operate. Turning now to the figures, FIG. 1 illustrates a block diagram of an example computing environment 100 in which illustrative embodiments of the present disclosure may be implemented. In some embodiments, the computing environment 100 may include a remote device 102 and a host device 112.

Consistent with various embodiments, the remote device 102 and the host device 112 may be computer systems. The remote device 102 and the host device 112 may include one or more processors 106 and 116 and one or more memories 108 and 118, respectively. The remote device 102 and the host device 112 may be configured to communicate with each other through an internal or external network interface 104 and 114. The network interfaces 104 and 114 may be, for example, modems or network interface cards. The remote device 102 and/or the host device 112 may be equipped with a display or monitor. Additionally, the remote device 102 and/or the host device 112 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). In some embodiments, the remote device 102 and/or the host device 112 may be servers, desktops, laptops, or hand-held devices.

The remote device 102 and the host device 112 may be distant from each other and communicate over a network 150. In some embodiments, the host device 112 may be a central hub from which remote device 102 can establish a communication connection, such as in a client-server networking model. Alternatively, the host device 112 and remote device 102 may be configured in any other suitable networking relationship (e.g., in a peer-to-peer configuration or using any other network topology).

In some embodiments, the network 150 can be implemented using any number of any suitable communications media. For example, the network 150 may be a wide area network (WAN), a local area network (LAN), an internet, or an intranet. In certain embodiments, the remote device 102 and the host device 112 may be local to each other and communicate via any appropriate local communication medium. For example, the remote device 102 and the host device 112 may communicate using a local area network (LAN), one or more hardwire connections, a wireless link or router, or an intranet. In some embodiments, the remote device 102 and the host device 112 may be communicatively coupled using a combination of one or more networks and/or one or more local connections. For example, the first remote device 102 may be hardwired to the host device 112 (e.g., connected with an Ethernet cable) while a second remote device (not shown) may communicate with the host device using the network 150 (e.g., over the Internet).

In some embodiments, the network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 150.

In some embodiments, the remote device 102 may enable users to submit (or may submit automatically with or without user input) electronic documents (e.g., web pages or web sites) containing posts from social media and other sites to the host devices 112 in order to have the item reviews, expert testimony, blogs, forums, support documents, articles or social media posts ingested and analyzed for sentiment (e.g., by natural language processing system 122). For example, the remote device 102 may include an attribute module 110 and a user interface (UI). The attribute module 110 may be in the form of a web browser or any other suitable software module, and the UI may be any type of interface (e.g., command line prompts, menu screens, graphical user interfaces). The UI may allow a user to interact with the remote device 102 to submit, queries regarding attributes of an item to the host device 112. In some embodiments, the attribute module 110 may incorporate a web crawler or other software that allows the module to search for and automatically identify item reviews, social media posts regarding attributes of an item, expert testimony, and articles for monitoring by the host device 112.

In some embodiments, the remote device 102 may further include a rank notification receiver module 111. This module may be configured to receive notifications, from the host device 112, of the relative ranks or removal of various item features common to an item. In some embodiments, the item is a product and these relative ranks may then be used by the remote device 102 to aid prospective purchasers in determining which product features are more important to consider when selecting among a group of competing products features.

In some embodiments, the host device 112 may include a natural language processing system 122. The natural language processing system 122 may include a natural language processor 124 and a sentiment ranker module 130. The natural language processor 124 may include numerous subcomponents, such as a tokenizer, a part-of-speech (POS) tagger, a semantic relationship identifier, and a syntactic relationship identifier. An example natural language processor is discussed in more detail in reference to FIG. 2.

In some embodiments, the sentiment ranker module 130 may be configured to remove item features based on an analysis of the sentiment associated with ingested and annotated social media posts for referenced attributes of an item. In addition, the attribute module 110 may be connected to the sentiment ranker module 130 and may serve to notify a user at the remote system 102 of the relative rank or removal of item features from an index of a database.

In some embodiments, the natural language processing system 122 may further include a search application (not shown). The search application may be implemented using a conventional or other search engine, and may be distributed across multiple computer systems. The search application may be configured to search one or more databases or other computer systems for attributes of an item. For example, the search application may be configured to search a corpus of information.

While FIG. 1 illustrates a computing environment 100 with a single host device 112 and a single remote device 102, suitable computing environments for implementing embodiments of this disclosure may include any number of remote devices and host devices. The various modules, systems, and components illustrated in FIG. 1 may exist, if at all, across a plurality of host devices and remote devices. For example, some embodiments may include two host devices. The two host devices may be communicatively coupled using any suitable communications connection (e.g., using a WAN, a LAN, a wired connection, an intranet, or the Internet). The first host device may include a natural language processing system configured to ingest and annotate item reviews, and the second host device may include a software module configured to compare and rank item features based on the ingested item reviews.

It is noted that FIG. 1 is intended to depict the representative major components of an exemplary computing environment 100. In some embodiments, however, individual components may have greater or lesser complexity than as represented in FIG. 1, components other than or in addition to those shown in FIG. 1 may be present, and the number, type, and configuration of such components may vary.

Figure 2:
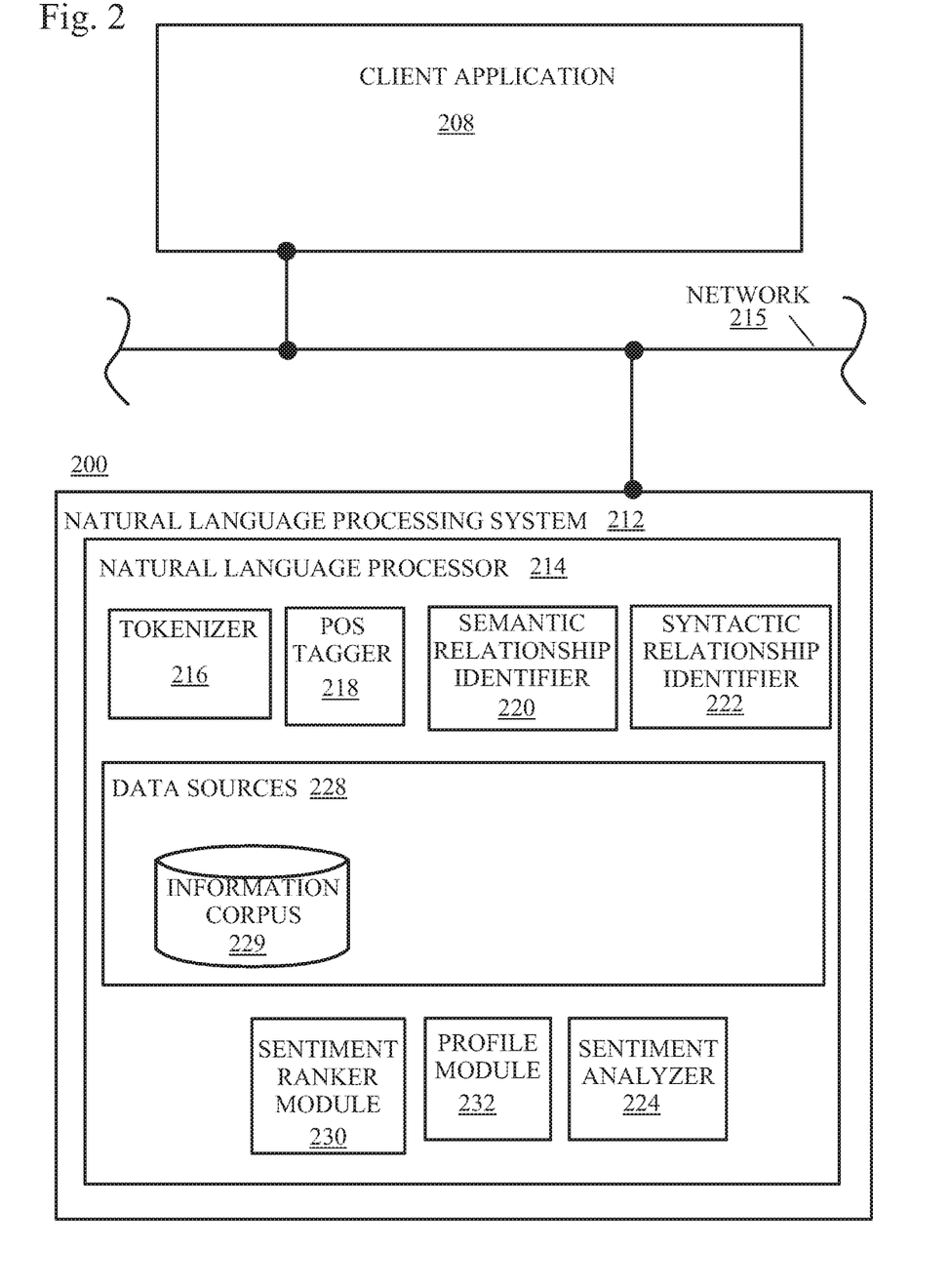
FIG. 2 illustrates a block diagram of an exemplary system architecture, including a natural language processing system.

Referring now to FIG. 2, shown is a block diagram of an exemplary system architecture 200, including a natural language processing system 212, configured to use online content to monitor how often attributes of an item are referenced, in accordance with embodiments of the present disclosure. In some embodiments, a remote device (such as remote device 102 of FIG. 1) may submit electronic documents or webpages (containing item reviews to be analyzed) to the natural language processing system 212 which may be housed on a host device (such as host device 112 of FIG. 1). Such a remote device may include a client application 208, which may itself involve one or more entities operable to generate or modify information in the webpages that are then dispatched to a natural language processing system 212 via a network 215.

Consistent with various embodiments, the natural language processing system 212 may respond to electronic document submissions sent by the client application 208. In one embodiment, the natural language processing system 212 may analyze a received social media post or other online content to aid in the analysis of the relative importance of product features for consumer consideration based on the number of times an attribute was referenced relative to a product. In some embodiments, the natural language processing system 212 may include a natural language processor 214, data sources 228, and a sentiment ranker module 230.

The natural language processor 214 may be a computer module that analyzes the received item reviews, online content, and other electronic documents. The natural language processor 214 may perform various methods and techniques for analyzing electronic documents (e.g., syntactic analysis, semantic analysis, etc.). The natural language processor 214 may be configured to recognize and analyze any number of natural languages. In some embodiments, the natural language processor 214 may parse passages of the documents. Further, the natural language processor 214 may include various modules to perform analyses of online content such as social media and other websites. These modules may include, but are not limited to, a tokenizer 216, a part-of-speech (POS) tagger 218, a semantic relationship identifier 220, a syntactic relationship identifier 222, and sentiment analyzer 224.

In some embodiments, the tokenizer 216 may be a computer module that performs lexical analysis. The tokenizer 216 may convert a sequence of characters into a sequence of tokens. A token may be a string of characters included in an electronic document and categorized as a meaningful symbol. Further, in some embodiments, the tokenizer 216 may identify word boundaries in an electronic document and break any text passages within the document into their component text elements, such as words, multiword tokens, numbers, and punctuation marks. In some embodiments, the tokenizer 216 may receive a string of characters, identify the lexemes in the string, and categorize them into tokens.

Consistent with various embodiments, the POS tagger 218 may be a computer module that marks up a word in passages to correspond to a particular part of speech. The POS tagger 218 may read a passage or other text in natural language and assign a part of speech to each word or other token. The POS tagger 218 may determine the part of speech to which a word (or other text element) corresponds based on the definition of the word and the context of the word. The context of a word may be based on its relationship with adjacent and related words in a phrase, sentence, or paragraph. In some embodiments, the context of a word may be dependent on one or more previously analyzed electronic documents (e.g., the content of one item review or reference to an attribute of an item may shed light on the meaning of text elements in another item review, particularly if they are reviews or references to attributes of the same item). Examples of parts of speech that may be assigned to words include, but are not limited to, nouns, verbs, adjectives, adverbs, and the like. Examples of other part of speech categories that POS tagger 218 may assign include, but are not limited to, comparative or superlative adverbs, wh-adverbs, conjunctions, determiners, negative particles, possessive markers, prepositions, wh-pronouns, and the like. In some embodiments, the POS tagger 218 may tag or otherwise annotate tokens of a passage with part of speech categories. In some embodiments, the POS tagger 218 may tag tokens or words of a passage to be parsed by other components of the natural language processing system 212.

In some embodiments, the semantic relationship identifier 220 may be a computer module that is configured to identify semantic relationships of recognized text elements (e.g., words, phrases) in documents. In some embodiments, the semantic relationship identifier 220 may determine functional dependencies between entities and other semantic relationships.

Consistent with various embodiments, the syntactic relationship identifier 222 may be a computer module that is configured to identify syntactic relationships in a passage composed of tokens. The syntactic relationship identifier 222 may determine the grammatical structure of sentences such as, for example, which groups of words are associated as phrases and which word is the subject or object of a verb. The syntactic relationship identifier 222 may conform to formal grammar.

Consistent with various embodiments, the sentiment analyzer 224 may be a computer module that is configured to identify and categorize the sentiments associated with tokens of interest. In some embodiments, the sentiment analyzer may be configured to identify, within text passages, and annotate keywords that are preselected as high quality indicators of sentiment polarity (e.g., indicators of positive sentiment could include brilliant, excellent, or fantastic). Various tools and algorithms may be used the sentiment analyzer 224 as are known to those skilled in the art (e.g., Naïve Bayes lexical model).

In some embodiments, the natural language processor 214 may be a computer module that may parse a document and generate corresponding data structures for one or more portions of the document. For example, in response to receiving a set of item reviews from a website that includes a collection of consumer item reviews at the natural language processing system 212, the natural language processor 214 may output parsed text elements from the product reviews as data structures. In some embodiments, a parsed text element may be represented in the form of a parse tree or other graph structure. To generate the parsed text element, the natural language processor 214 may trigger computer modules 216-224.

In some embodiments, the output of the natural language processor 214 may be stored as an information corpus 229 in one or more data sources 228. In some embodiments, data sources 228 may include data warehouses, information corpora, data models, and document repositories. The information corpus 229 may enable data storage and retrieval. In some embodiments, the information corpus 229 may be a storage mechanism that houses a standardized, consistent, clean, and integrated copy of the ingested and parsed references to attributes and a candidate set of structured attributes for an item. Data stored in the information corpus 229 may be structured in a way to specifically address analytic requirements. In some embodiments, the information corpus 229 may be a relational database. In other embodiments, the information corpus 229 may be unstructured document-oriented database.

In some embodiments, the natural language processing system 212 may include a sentiment ranker module 230. The sentiment ranker module 230 may be a computer module that is configured to generate sentiment scores for specific forms of item features based on the analysis of annotated references to attributes of the item.

Figure 3:
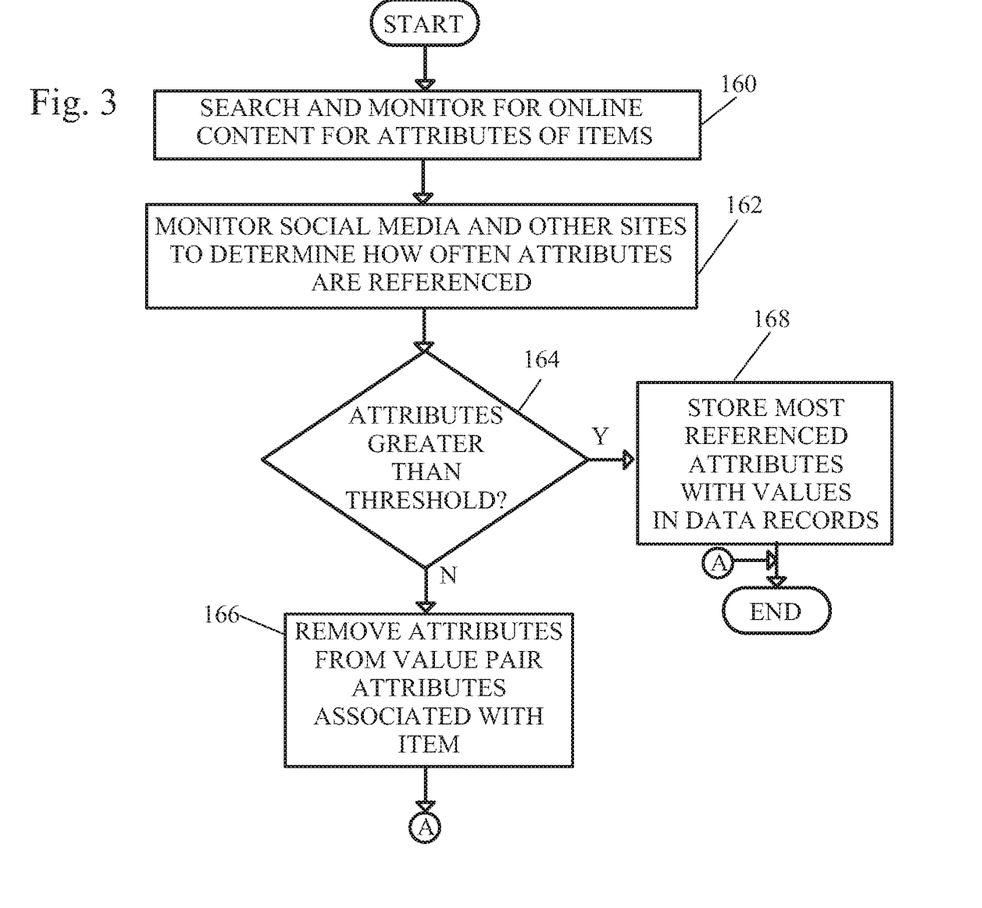
FIG. 3 shows a flow diagram of a method of utilizing social media and articles to suggest item attribute importance to improve site level searching.

FIG. 3 shows a flow diagram of a method of utilizing online content to suggest item attribute importance to improve site level searching.

An enterprise system of records and associated indexes, for example data sources 228 stores attributes regarding a plurality of items. The attributes are stored within the data sources 228 as unstructured data comprising natural language pairs and attributes, such that natural language terms can better match what is important when a query is submitted.

The enterprise system may receive queries regarding features or attributes of the items. In order to improve or refine the indexing of the stored attributes associated with items for further search queries, the attributes which are stored in association with the plurality of items are attributes which appear within online content above a threshold.

In a first step, online content for attributes of the item are searched for and monitored to determine attributes referenced for the item (step 160), for example by the attribute processor 126 of the natural language processing system 122.

Online content is monitored to determine how often attributes of items are referenced (step 162). Online content is scoured and natural language processing capabilities are used to identify the most talked about or referenced attributes when describing items, for example using the natural language processing system 122. Input from subject matter experts may also be used to identify attributes as well. Additionally, attributes that have increased in popularity may also be identified.

If the number of times the attribute is mentioned is below a threshold (step 164), the attribute is removed from the value pair attributes associated with the item within the index of the enterprise system (step 166) and the method returns to step 164.

If the number of times the attribute is mentioned is greater than a threshold (step 164), the most referenced attributes are added or stored with values in the data records of the data sources of the index of the enterprise system (step 168) and the method ends. It should be noted that if an attribute is already present in the data records, the attribute may be maintained within the index, since the attribute is greater than a threshold.

In another embodiment, a notification regarding the removal of an attributed from the index may be sent to an administrator. The notification may be used to track and analyze current trends relative to the item.

The threshold may be manually set by an administrator or may be determined through trend analysis. Trends would determine a spike in popularity. For example if suddenly a significant number of users are talking about widget X. Then, users are likely talking about specific features of widget X. So, the threshold that may be used is "if widget X or associated features of widget X are mentioned more than 20 times across 5 articles" add or maintain the feature to the index.

Figure 4:
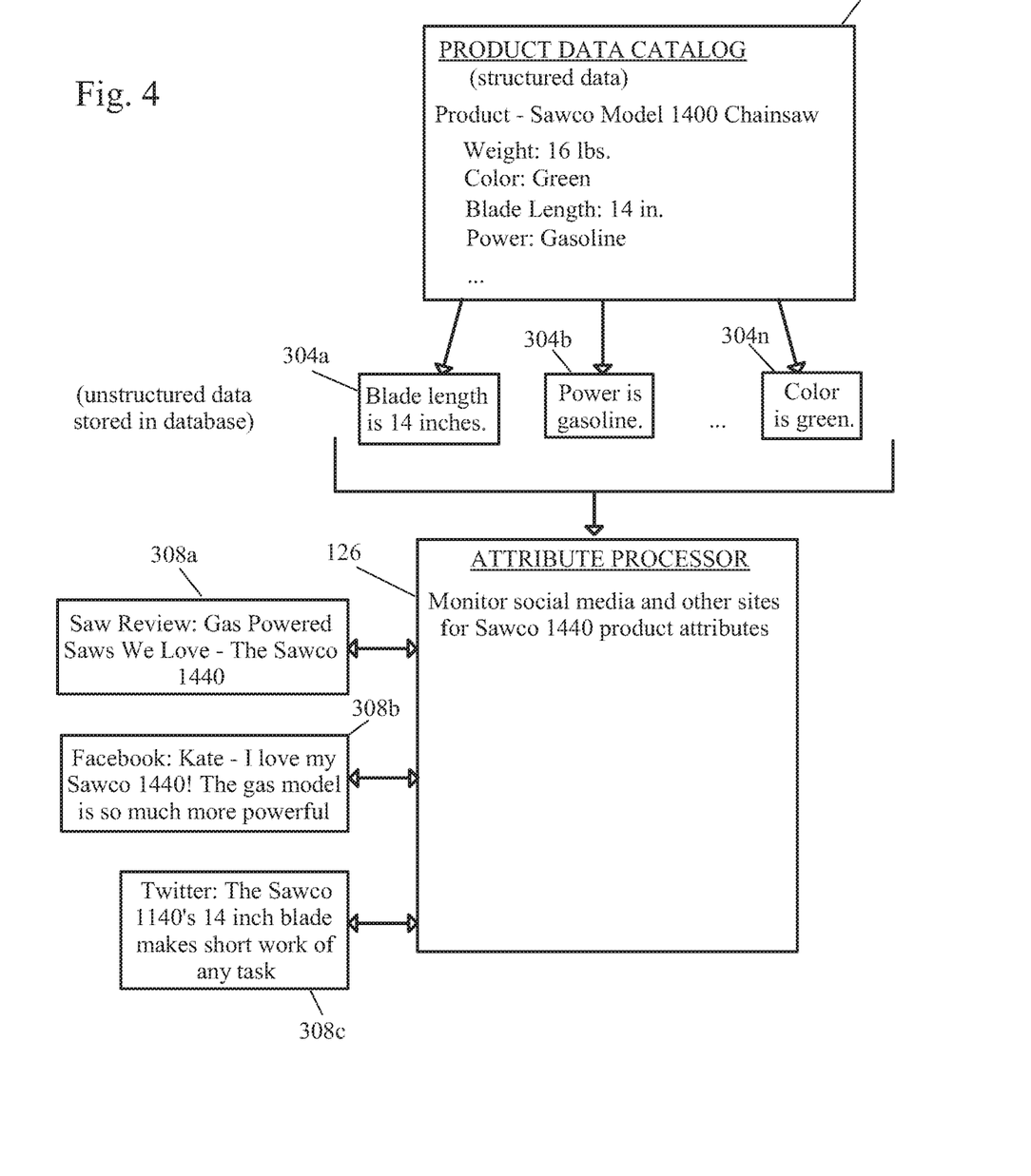
FIG. 4 shows a schematic of an example utilizing social media to improve site level searching.

FIG. 4 shows a schematic of an example utilizing social media to improve site level searching.

A product data catalog 300 for a do-it-yourself retailer, may contain an entry for an item, such as a chainsaw (e.g., Sawco Model 1440). The index of the product data catalog 300 may be indexed within a data source 228. The product description for this item within the catalog is structured data, so the structured data is broken into unstructured data of natural language pairs and attributes for index purposes, such that natural language terms can better match what is important, for example by the natural language processing system 122. In this example, the natural language pairs and attributes from the product data catalog may be as follows:

blade length is fourteen inches 304a; power is gasoline 304b; and color is green 304n, among others.

An attribute processor 126 monitors various online content, such as social media outlets for chatter, articles, news and trends 308a-308c for the attributes of the Sawco Model 1440. As can be seen in the example of FIG. 4, there is discussions around the 14 inch blade, and the gasoline power, but no mention about the color. Thus, the color ("color is green") is an attribute that will be removed from the index as it is not an attribute that is determined to be important in regards to the product and the color will be an attribute that will not be returned in response to a query in future natural language search purposes. It should be noted that if at a future date the color is discussed within monitored online content at a frequency which is greater than a threshold, the attribute of color will be indexed relative to the product again.

Based on the monitoring of online content for attributes or products and their associated popularity or trendiness, if a natural language query of "I want a chainsaw with a 14 inch blade that is gasoline powered" is received, for example by the host devices 112 via the remote device 102, search results which may be returned to the user in answer to the query above, would include the attributes of "14 inch blade", "gasoline power" and the product name of "Sawco Model 1400 Chainsaw" and would not include "green" as it would have been removed from the index.

If an additional attribute, such as horsepower were to be discussed in 10 articles and mentioned 15 times, the attribute of horsepower would be added to the value pair attribute.

Certain embodiments of the present invention utilizing online content, such as social media and articles to suggest item attribute importance. By adjusting the attributes present within the index by removing item attributes which are not as socially relevant, and adding or maintaining item attributes that are, site level searching of the index in response to a query is improved, providing a more accurate result for the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of utilizing online content to suggest attribute importance for an item to improve site level searching comprising the steps of:

the computer searching for and monitoring the online content for attributes of an item to determine attributes referenced for the item;

the computer receiving previously analyzed electronic documents with respect to a Web crawler associated with previous user searches;

the computer determining, based on said previously analyzed electronic documents, a contextual meaning of terms of said online content;

the computer analyzing a plurality of natural languages associated with said online content;

the computer identifying lexemes within strings of characters of the online content;

the computer converting, based on said lexemes, a sequence of said characters of the online content into a sequence of associated tokens;

the computer identifying syntactic relationships within a passage composed of a group of tokens of said of said sequence of associated tokens;

the computer categorizing sentiments associated with said group of tokens;

the computer identifying and annotating, within text passages of said online content, keywords preselected as indicators of sentiment polarity associated with said group of tokens;

the computer tagging the tokens based on speech categories of said online content;

in response to the syntactically and semantically analyzing, the analyzing, the converting, the identifying and annotating, and the tagging, the computer adjusting a presence of an attribute from a value pair attribute associated with the item based on the determination of how often attributes of the item are referenced; and the computer storing an output of a natural language processor associated with said sequence of associated tokens, as an information corpus within data warehouses, information corpora, data models, and document repositories such that said information corpus stores and retrieves data as a copy of ingested and parsed references with respect to said attribute and a candidate set of structured attributes for said item, wherein said data stored within said information corpus is structured such that analytical requirements are addressed.

2. The method of claim 1, wherein the online content searched for and monitored is selected from the group consisting of: news articles, expert testimony regarding the item, blogs, forums, and support documents.

3. The method of claim 1, wherein natural language processing is used to search for and monitor the online content.

4. The method of claim 1, further comprising the step of: the computer sends a notification to an administrator regarding removal of the attribute from the value pair attribute associated with the item.

5. The method of claim 1, wherein the presence of the attribute is adjusted by removing the attributed from the value pair attribute when the attributes are referenced at number of times below a threshold.

6. The method of claim 1, wherein the presence of the attribute is adjusted by adding the attributed from the value pair attribute when the attributes are referenced at number of times greater than a threshold.

7. A computer program product for utilizing online content to suggest attribute importance for an item to improve site level searching, a computer comprising at least one processor, one or more memories, one or more computer readable storage media, the computer program product comprising a computer readable storage medium having program instructions embodied therewith, the program instructions executable by the computer to perform a method comprising:

searching for and monitoring, by the computer, the online content for attributes of an item to determine attributes referenced for the item;

receiving, by the computer, previously analyzed electronic documents with respect to a Web crawler associated with previous user searches;

determining, by the computer based on said previously analyzed electronic documents, a contextual meaning of terms of said online content;

analyzing, by the computer, a plurality of natural languages associated with said online content;

identifying, by the computer, lexemes within strings of characters of the online content;

converting, by the computer based on said lexemes, a sequence of said characters of the online content into a sequence of associated tokens;

identifying, by the computer, syntactic relationships within a passage composed of a group of tokens of said of said sequence of associated tokens;

categorizing, by the computer, sentiments associated with said group of tokens;

identifying and annotating, by the computer within text passages of said online content, keywords preselected as indicators of sentiment polarity associated with said group of tokens;

tagging, by the computer, the tokens based on speech categories of said online content;

in response to the syntactically and semantically analyzing, the analyzing, the converting, the identifying and annotating, and the tagging, adjusting, by the computer, a presence of an attribute from a value pair attribute associated with the item based on the determination of how often attributes of the item are referenced; and storing an output of a natural language processor associated with said sequence of associated tokens, as an information corpus within data warehouses, information corpora, data models, and document repositories such that said information corpus stores and retrieves data as a copy of ingested and parsed references with respect to said attribute and a candidate set of structured attributes for said item, wherein said data stored within said information corpus is structured such that analytical requirements are addressed.

8. The computer program product of claim 7, wherein the online content searched for and monitored is selected from the group consisting of: news articles, expert testimony regarding the item, blogs, forums, and support documents.

9. The computer program product of claim 7, wherein natural language processing is used to search for and monitor the online content.

10. The computer program product of claim 7, further comprising program instructions sending, by the computer, a notification to an administrator regarding removal of the attribute from the value pair attribute associated with the item.

11. The computer program product of claim 7, wherein the presence of the attribute is adjusted, by the computer, by removing the attributed from the value pair attribute when the attributes are referenced at number of times below a threshold.

12. The computer program product of claim 7, wherein the presence of the attribute is adjusted, by the computer, by adding the attributed from the value pair attribute when the attributes are referenced at number of times greater than a threshold.

13. A computer system for utilizing online content to suggest attribute importance for an item to improve site level searching, the computer system comprising a computer comprising at least one processor, one or more memories, one or more computer readable storage media having program instructions executable by the computer to perform the program instructions comprising:

searching for and monitoring, by the computer, the online content for attributes of an item to determine attributes referenced for the item;

receiving, by the computer, previously analyzed electronic documents with respect to a Web crawler associated with previous user searches;

determining, by the computer based on said previously analyzed electronic documents, a contextual meaning of terms of said online content;

analyzing, by the computer, a plurality of natural languages associated with said online content;

identifying, by the computer, lexemes within strings of characters of the online content;

converting, by the computer based on said lexemes, a sequence of said characters of the online content into a sequence of associated tokens;

identifying, by the computer, syntactic relationships within a passage composed of a group of tokens of said of said sequence of associated tokens;

categorizing, by the computer, sentiments associated with said group of tokens;

identifying and annotating, by the computer within text passages of said online content, keywords preselected as indicators of sentiment polarity associated with said group of tokens;

tagging, by the computer, the tokens based on speech categories of said online content;

in response to the syntactically and semantically analyzing, the analyzing, the converting, the identifying and annotating, and the tagging, adjusting, by the computer, a presence of an attribute from a value pair attribute associated with the item based on the determination of how often attributes of the item are referenced; and storing an output of a natural language processor associated with said sequence of associated tokens, as an information corpus within data warehouses, information corpora, data models, and document repositories such that said information corpus stores and retrieves data as a copy of ingested and parsed references with respect to said attribute and a candidate set of structured attributes for said item, wherein said data stored within said information corpus is structured such that analytical requirements are addressed.

14. The computer system of claim 13, wherein the online content searched for and monitored is selected from the group consisting of: news articles, expert testimony regarding the item, blogs, forums, and support documents.

15. The computer system of claim 13, wherein natural language processing is used to search for and monitor the online content.

16. The computer system of claim 13, further comprising program instructions sending, by the computer, a notification to an administrator regarding removal of the attribute from the value pair attribute associated with the item.

17. The computer system of claim 13, wherein the presence of the attribute is adjusted, by the computer, by removing the attributed from the value pair attribute when the attributes are referenced at number of times below a threshold.

18. The computer system of claim 13, wherein the presence of the attribute is adjusted, by the computer, by adding the attributed from the value pair attribute when the attributes are referenced at number of times greater than a threshold.

* * * * *